March 31, 1964     J. R. GREINER     3,127,471
STRAIN RELIEF CLAMP
Filed May 1, 1961
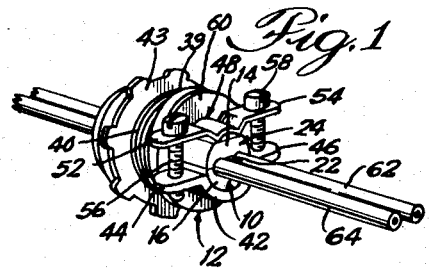
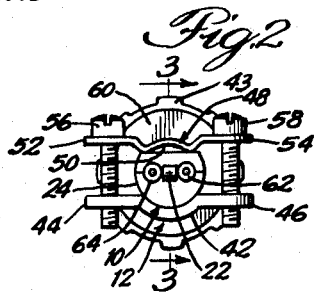
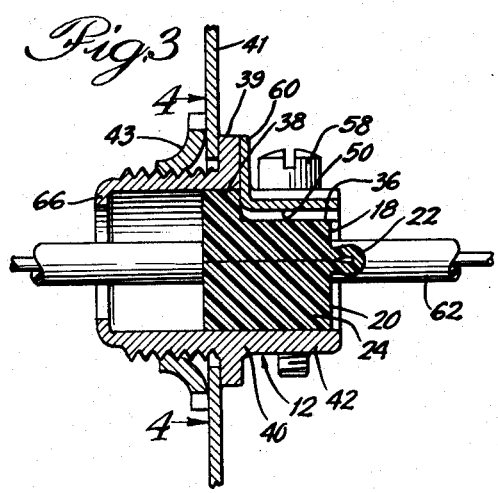
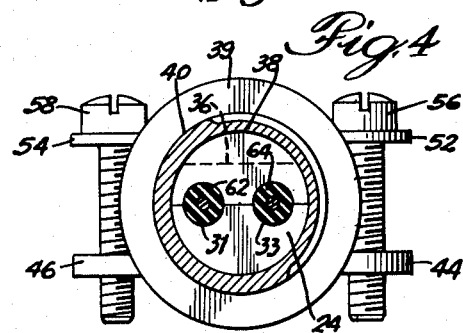
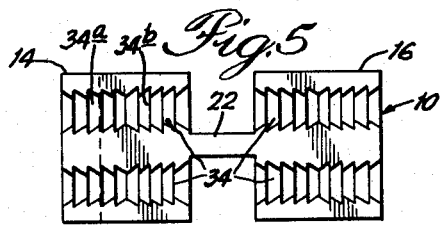
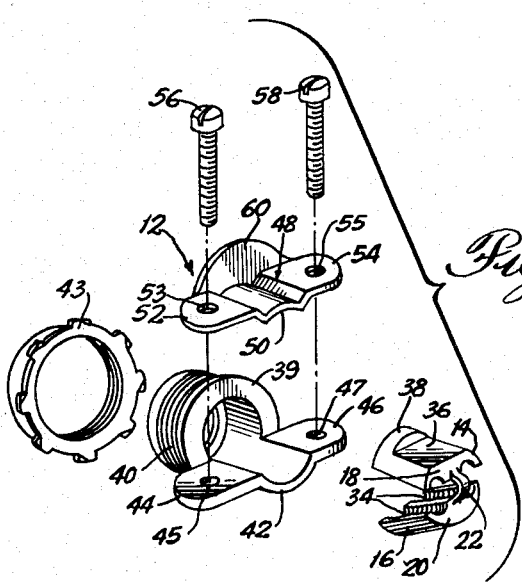
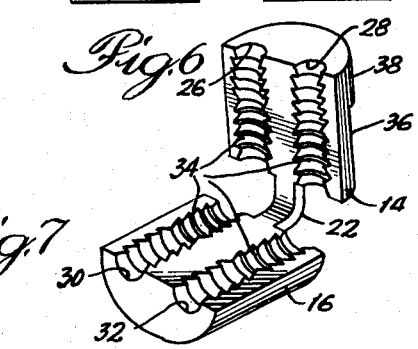
INVENTOR:
John R. Greiner,
BY
Bair, Freeman & Molinare
ATTORNEYS.

United States Patent Office 3,127,471
Patented Mar. 31, 1964

3,127,471
STRAIN RELIEF CLAMP
John R. Greiner, Marshalltown, Iowa, assignor to
Lennox Industries, Inc., a corporation of Iowa
Filed May 1, 1961, Ser. No. 106,712
1 Claim. (Cl. 174—135)

This invention relates to a strain relief clamp for insulated wires, and particularly to a clamp adapted for use in combination with a cable connector.

The electrical wiring for various installations is subject to rigid specifications. It is necessary that electrical conductors be enclosed within conduit, electrical metallic tubing, suitable metal raceway or electrical enclosure, or armored cable, with certain exceptions. In the case of oil-fired central furnaces, for example, certain electrical cord or appliance wiring material having neoprene, thermoplastic, or equally durable insulation may be employed alone, within a burner, fan, or similar compartment. Low-voltage safety control circuits may be wired in like manner if the wiring is suitably located and adequately shielded from harm. The insulated wiring must be adequately supported and provided with suitable strain relief. Protection from abrasion and insulation from other elements of the installation are required.

An important object of the present invention is to provide a strain relief clamp for insulated wiring, which resists pulling forces on the wires.

A particular object is to provide a strain relief clamp which holds the wires without causing substantial deformation or rupturing of the wire insulation, and which separates the insulated wires from each other and from surrounding elements.

Another particular object is to provide a strain relief clamp adapted for use in combination with standard electrical connectors.

An additional object is to provide a clamp which is adapted for gripping insulated wires to prevent slippage of the wires when pulling forces are exerted thereon.

A further object is to provide a strain relief clamp which satisfies the electrical wiring requirements for strain relief, support, abrasion, and insulation.

Another object is to provide a simple, economical, and adaptable strain relief clamp.

These and other objects, advantages and functions of the invention will be apparent on reference to the specification and to the attached drawings illustrating a preferred embodiment of the invention, in which like parts are identified by like reference symbols in each of the views and in which:

FIGURE 1 is a perspective view of the strain relief clamp mounted in a cable connector, and securing a pair of insulated conductors;

FIGURE 2 is an end elevational view thereof;

FIGURE 3 is an enlarged longitudinal sectional view taken on line 3—3 of FIGURE 2;

FIGURE 4 is a cross-sectional view taken on line 4—4 of FIGURE 3;

FIGURE 5 is an enlarged plan view of the strain relief clamp in open position;

FIGURE 6 is a perspective view thereof, illustrating the clamp in the operation of closing; and FIGURE 7 is an exploded perspective view of the assembly of FIGURE 1.

The strain relief clamp of the invention includes a pair of dielectric elements which together form a collar. Each element is provided with a plurality of semicircular grooves formed therein longitudinally thereof. The grooves on each element mate with those on the other element to form circular openings through the collar. The elements are adapted for clamping a plurality of insulated wires between them in the openings. Preferably, the grooves include serrations providing gripping surfaces thereon. One of the elements is provided with a lateral retaining flange. The strain relief clamp is insertable in the body of a cable connector, and may be secured therein. Insulated wires held by the strain relief clamp then pass centrally through the connector, with the wires separated and insulated from each other and from the connector. The wires are held by the clamp against pulling forces, and the connector holds the clamp in place.

A preferred embodiment of the strain relief clamp is indicated at 10 in the drawings. It is adapted for use with most armored cable (BX) connectors, and particularly with a Greenfield-type metal electrical connector as indicated at 12 in the drawings. Such connector is adapted for clamping armored cable therein. The strain relief clamp 10 and the cable connector 12 are employed together as a strain relief fitting.

The strain relief clamp 10 includes a pair of rounded or generally semicylindrical dielectric elements 14 and 16. In the preferred embodiment, the elements are connected at their normally outer ends 18 and 20, respectively, by an integral flexible strip 22. The clamp elements preferably are constructed of a rigid dielectric plastic of conventional material suitable for the intended use. It is further preferred that the clamp, including the elements and the connecting strip, be molded as one unit. This construction serves to keep the mating elements together for use, at which time the unit is bent at the strip 22 to form a collar or sleeve 24.

One clamp element 14 is provided with a plurality of spaced semicircular longitudinal grooves 26 and 28 therein, parallel to the longitudinal axis and also spaced inwardly from the sides of the element. The illustrative element is adapted for holding two insulated wires, but the number of grooves may be varied, depending upon the requirements of the application. In like manner, two longitudinal grooves 30 and 32 are provided on the mating clamp element 16. When the elements are brought together, the grooves on each element mate with those on the other element to form circular openings through the collar 24. Grooves 26 and 30 form one opening 31, and grooves 28 and 32 form a second opening 33. The clamp elements 14 and 16 are adapted for clamping an insulated wire between the elements in each opening, with the surfaces of the grooves serving as gripping jaws.

A plurality of serrations or teeth 34 are provided on each of the grooves 26, 28, 30 and 32, furnishing gripping surfaces thereon. The serrations may take the form of threads, ridges, or other suitable protrusions. The serrations are especially adapted to provide a bite on the relatively slick surface of wire insulated with thermoplastic or other similar material, as in appliance wiring material. They prevent wire slippage when a pulling force is exerted on the wire. In the illustrative embodiment, the serrations are directed in opposite longitudinal directions on either side of the center of each groove, as indicated respectively at 34a and 34b, to resist slippage in either direction.

One of the clamp elements, numbered 14, preferably is provided with a flattened side 36 opposite to the side bearing the grooves 26 and 28. A lateral retaining flange 38 extends outwardly from the flattened surface. This construction enables the clamp to be secured within the connector 12.

The cable connector 12 includes an externally threaded circular tubular body 40 having a peripheral end rim 39, which is adapted for mounting on a suitable member. Thus, the body may be inserted in a suitable wall opening in a panel 41, with the rim 39 on one side of the panel, and fastened in place by engagement with an internally threaded nut member 43 on the reverse side of the panel. An arcuate supporting flange 42 extends longitudinally form the rim of the connector body, integral therewith. Two integral ears 44 and 46 having internally threaded openings 45 and 47 extend outwardly from the ends of the flange.

A separate connector retaining element or clamp 48 is provided for clamping a member in the connector body 40 and on the flange 42. The retaining element is a strip member which may have a central portion 50 contoured to fit the surface of the cable with which it is commonly employed. Such construction also serves for engagement with the flattened surface 36 of the strain relief clamp element 14. Alternatively, the central portion 50 of the retaining element may be flattened or otherwise suitably shaped for engagement with the strain relief clamp.

The retaining element 48 includes ears 52 and 54 on the opposite ends thereof, and openings 53 and 55, respectively, are provided through the ears. The openings in the retaining element ears register with the threaded openings 45 and 47 in the connector flange ears. A pair of securing screws 56 and 58 are insertable through the openings 53 and 55 in the retaining element ears, and extend through the openings 45 and 47 in the flange ears in threaded engagement therewith. When the screws are tightened, the retaining element 48 moves laterally in the direction of the connector flange 42, to clamp the strain relief clamp 10 in the form of the collar 24 therebetween. The retaining element 50 also includes an outwardly extending reinforcing flange 60 normal to and integral with the central and ear portions 50, 52 and 54 of the element, which flange abuts against the rim 39 of the connector body 40.

The strain relief clamp 10 is assembled on a pair of insulated wires 62 and 64, with the elements 14 and 16 on opposite sides thereof. The wires are clamped in the openings 31 and 33 formed by the pairs of grooves 26 and 30, and 28 and 32, and with the connecting strip 22 between the wires. The wires with the resulting strain relief collar 24 therearound are inserted through the connector body 40. The retaining flange 38 on the strain relief clamp is inserted in the body inwardly of the connector flange 42, and the flattened surface 36 on the clamp element 14 is arranged above the connector flange. The connector retaining element 48 is placed on the flattened surface 36 of the clamp element 14, and the screws 56 and 58 are inserted and tightened. The screws are tightened sufficiently to cause the serrations 34 on the clamp elements to bite into the insulation wiring and hold the wiring firmly against pulling forces. Engagement of the retaining flange 38 on the clamp element 14 with the inner edge of the connector retaining element 48 prevents the strain relief clamp from being pulled out of the connector.

The connector body 40 preferably is provided at the end opposite to the support flange 42 with retaining means in the form of a circular inwardly extending flange 66. Such means prevents the strain relief clamp from being pulled through the connector at this end.

In the preferred embodiment, the end of the strain relief clamp collar 24 at which is located the retaining flange 38 is circular, corresponding to the opening in the connector body 40 and having a slightly smaller diameter. The assembly of strain relief clamp and wires therein substantially fills the body opening. The insulated wires are separated from each other and from the wall of the connector body by the clamp 10, so that the wires are well insulated in the event of fracture of the wire insulation where they are clamped. At the same time, the construction serves to hold the wires securely without causing substantial deformation or fracture of the insulation. The construction also serves to protect the insulated wires from abrasion.

The size and shape of the strain relief clamp 10 and the number and size of the grooves in the elements thereof may be varied according to the requirements of the application. An L type of connector may be employed in place of the straight connector illustrated, and the connector may be varied in other ways. It will also be apparent that other changes and modifications may be made in the construction and arrangement of the parts, within the spirit and scope of the invention. It is intended that such changes and modifications be included within the scope of the appended claim.

What I claim as new and desire to secure by Letters Patent of the United States is:

A strain relief fitting for insulated wires which comprises, in combination, a cable connector comprising a tubular body having a support flange extending therefrom, and retaining means fastened to said support flange; and a strain relief clamp member positioned between said retaining means and said support flange and having an end portion within said body, said strain relief clamp comprising a pair of molded dielectric elements joined by an integral flexible strip for enabling said dielectric elements to be folded together to form a collar, a plurality of spaced-apart, longitudinal semicircular grooves formed in each of said dielectric elements, the grooves on each dielectric element mating with a groove on the other dielectric element to form circular openings through said collar, said dielectric elements having serrations on the surfaces of said grooves for clamping insulated wires between them in said circular openings, each groove having two series of such serrations, the gripping edges of which project in opposite directions longitudinally of the groove, and a lateral retaining flange on said end portion of the strain relief clamp member within said tubular body in engagement with said retaining means to cause said clamp member to be tightly held within said cable connector.

References Cited in the file of this patent
UNITED STATES PATENTS

| | | |
|---|---|---|
| 206,702 | Chambers | Aug. 6, 1878 |
| 795,867 | Stakelbeck | Aug. 1, 1905 |
| 804,204 | Brown | Nov. 14, 1905 |
| 929,543 | Bonnell | July 27, 1909 |
| 2,783,442 | Burnosky | Feb. 26, 1957 |
| 2,895,003 | Rapata | July 14, 1959 |
| 2,927,146 | Salisbury | Mar. 1, 1960 |
| 2,930,840 | Klumpp | Mar. 29, 1960 |
| 2,952,730 | Simonds | Sept. 13, 1960 |